United States Patent
Longu (10) Patent No.: US 9,891,129 B2
(45) Date of Patent: Feb. 13, 2018

(54) SYSTEM FOR MEASURING PRESSURE ABLE TO DISCRIMINATE A FAILURE FROM AN OVER PRESSURE OR UNDER PRESSURE

(71) Applicant: AUXITROL S.A., Bourges (FR)

(72) Inventor: Guillaume Longu, Saint Martin D'Auzigny (FR)

(73) Assignee: AUXITROL S.A., Bourges (FR)

( * ) Notice: Subject to any disclaimer, the term of this patent is extended or adjusted under 35 U.S.C. 154(b) by 96 days.

(21) Appl. No.: 14/897,219

(22) PCT Filed: Jun. 16, 2014

(86) PCT No.: PCT/EP2014/062576
§ 371 (c)(1),
(2) Date: Dec. 9, 2015

(87) PCT Pub. No.: WO2014/202533
PCT Pub. Date: Dec. 24, 2014

(65) Prior Publication Data
US 2016/0146687 A1    May 26, 2016

(30) Foreign Application Priority Data

Jun. 17, 2013   (FR) ...................................... 13 55668

(51) Int. Cl.
*G01L 9/12*      (2006.01)
*G01L 19/06*     (2006.01)
(Continued)

(52) U.S. Cl.
CPC ............ *G01L 19/0618* (2013.01); *G01D 3/08* (2013.01); *G01L 9/0047* (2013.01); *G01L 27/007* (2013.01)

(58) Field of Classification Search
None
See application file for complete search history.

(56) References Cited

U.S. PATENT DOCUMENTS 4,679,567 A * 7/1987 Hanlon ................ A61B 5/0215
                                              600/488
5,557,972 A * 9/1996 Jacobs .................... G01L 21/12
                                              73/755
(Continued)

FOREIGN PATENT DOCUMENTS

DE    102010040373    3/2012
FR    2966241         4/2012
FR    2982023         5/2013

OTHER PUBLICATIONS

International Search Report with English Language Translation, dated Sep. 15, 2014, Application No. PCT/EP2014/062576.
(Continued)

*Primary Examiner* — Andre Allen
(74) *Attorney, Agent, or Firm* — Blakely Sokoloff Taylor & Zafman LLP (57) ABSTRACT

The invention relates to a system for measuring pressure, including a pressure sensor comprising: a deformable membrane on which is placed a resistive bridge able to deliver a bridge voltage representative of a deformation of the deformable membrane caused by a pressure applied to said deformable membrane; a system for limiting the deformation of the deformable membrane, able to limit the bridge voltage in the case of an over-pressure or an under-pressure on the deformable membrane; and an amplifying electronic circuit connected to the resistive bridge, able to deliver an output voltage depending on the bridge voltage; the limiting system and the electronic circuit are conjointly configured so that the output voltage makes it possible to distinguish the case of failure of the pressure sensor and/or of the electronic circuit from the case of an over-pressure or under-pressure on the deformable membrane.

8 Claims, 5 Drawing Sheets

(51) Int. Cl.
*G01L 9/00* (2006.01)
*G01L 27/00* (2006.01)
*G01D 3/08* (2006.01)

(56) References Cited

U.S. PATENT DOCUMENTS

2002/0097034 A1 7/2002 Tanizawa
2004/0015282 A1* 1/2004 Babala .................... G01L 15/00
701/70

OTHER PUBLICATIONS

French Search Report, dated Apr. 7, 2014, French Application No. 1355668.

* cited by examiner

FIG. 6

SYSTEM FOR MEASURING PRESSURE ABLE TO DISCRIMINATE A FAILURE FROM AN OVER PRESSURE OR UNDER PRESSURE

GENERAL TECHNICAL FIELD

The invention relates to the field of pressure measuring systems, notably those comprising a pressure sensor with a deformable membrane.

PRIOR ART

A pressure measuring system conventionally comprises a pressure sensor for delivering an electrical signal representative of a detected pressure and an amplifying electronic circuit for amplifying the electrical signal coming from the sensor in order to obtain an output signal.

The electronic circuit makes it possible to amplify the signal coming from the sensor. The high and low ranges of the voltage of the output signal make it possible to signal a fault. For example, the electronic circuit can amplify the electrical signal coming from the sensor while keeping some ranges as fault detection zones.

However, on leaving the sensor, the electrical signal increases linearly as a function of the pressure so that the output signal Vs, an amplified version of the signal coming from the sensor Ve, can reach the high voltage zone dedicated to faults in the event of overpressure even when the pressure measuring system is not faulty.

There is consequently a need to be able to discriminate between a case of overpressure and a case of a fault in the sensor.

OVERVIEW OF THE INVENTION

The invention proposes to discriminate between a case of overpressure and a case of a fault in the sensor.

For this purpose, the invention proposes a pressure measuring system comprising:
  a pressure sensor comprising:
    a deformable membrane on which a resistive bridge is disposed capable of delivering a bridge voltage representative of a deformation of the deformable membrane, caused by a pressure applied on said deformable membrane;
    a system for limiting the deformations of the deformable membrane capable of limiting the bridge voltage in the case of overpressure or vacuum pressure at the deformable membrane;
  an amplifying electronic circuit connected to the resistive bridge capable of delivering an output voltage as a function of the bridge voltage;
  the limiting system and the electronic circuit being jointly configured so that the output voltage makes it possible to distinguish a case of a fault in the pressure sensor and/or in the electronic circuit from a case of overpressure or vacuum pressure at the deformable membrane.

The invention is advantageously completed by the following features, taken alone or in any one of their technically possible combinations:
  the limiting system and the electronic circuit are jointly configured so that: in nominal operation, the output voltage varies linearly between two values Vs_min and Vs_max for a pressure at the deformable membrane between Pmin and Pmax; and in the case of overpressure at the deformable membrane, the output voltage increases to saturate at a saturation voltage Vs_sat_max for a pressure at the deformable membrane greater than Pmax;
  the limiting system and the electronic circuit are furthermore jointly configured so that in the case of vacuum pressure, the output voltage decreases to saturate at a saturation voltage Vsatmin for a pressure difference (at the membrane) less than Pmin;
  the limiting system and the electronic circuit are furthermore jointly configured so that in the case of a fault in the pressure sensor and/or in the electronic circuit, the output voltage Vs reaches a voltage between a high fault voltage Vdefault_high and a supply voltage of the electronic circuit V2, or reaches a voltage between 0 and a low fault voltage Vdefault_low;
  the high fault voltage Vdefault_high is strictly greater than the saturation voltage value Vs_sat_max;
  the saturation voltage Vs_sat_max is strictly greater than the nominal voltage value Vsmax;
  the low fault voltage Vdefault_low is strictly less than the saturation voltage Vs_sat_min;
  the saturation voltage Vsat_min is strictly less than the nominal voltage value Vsmin;
  the deformable membrane comprises a first part and a second part surrounding the first part, the second part having a thickness greater than the thickness of the first part in such a way as to define a free space, the membrane being suspended above the free space;
  the limiting system comprises a lower end stop capable of limiting the deformations of the deformable membrane, said lower end stop being disposed below the deformable membrane;
  the limiting system further comprises an upper end stop capable of limiting the deformations of the deformable membrane, said upper end stop being disposed above the deformable membrane;
  the lower end stop includes islands that extend in the free space toward the membrane from a planar surface of the lower end stop, the islands forming a raised structure so that in the case of contact between the islands and the first part of the membrane, the contact area between the islands and the first part of the membrane will be small in relation to the dimensions of the first part of the membrane;
  the limiting system includes a central through recess, the measuring system being then capable of measuring a pressure differentially.
  the limiting system is made of material chosen from among the following materials: glass; quartz; alumina; ceramic; alloys; Si; SiC; sapphire.

In the event of overpressure, the invention allows the limiting system to "stop" the movement of the membrane which has the consequence of limiting the bridge voltage of the pressure sensor and thus of restricting the output voltage Vs of the pressure measuring system.

The invention thus relies on a joint adjustment of the amplifying electronic circuit and a dimensioning of the pressure sensor and particularly of the deformation system (in nominal operation) in order to restrict the output voltage Vs in a zone allocated to overpressure and as a consequence to differentiate between it and a saturation voltage of the electronic circuit revealing a fault in the sensor and/or the electronic circuit.

PRESENTATION OF THE FIGURES

Other features, aims and advantages of the invention will become apparent from the following description, which is purely illustrative and nonlimiting, and which must be read with reference to the appended drawings wherein.

In all the figures, similar elements bear identical reference numbers.

DETAILED DESCRIPTION OF THE INVENTION

Figure 1:
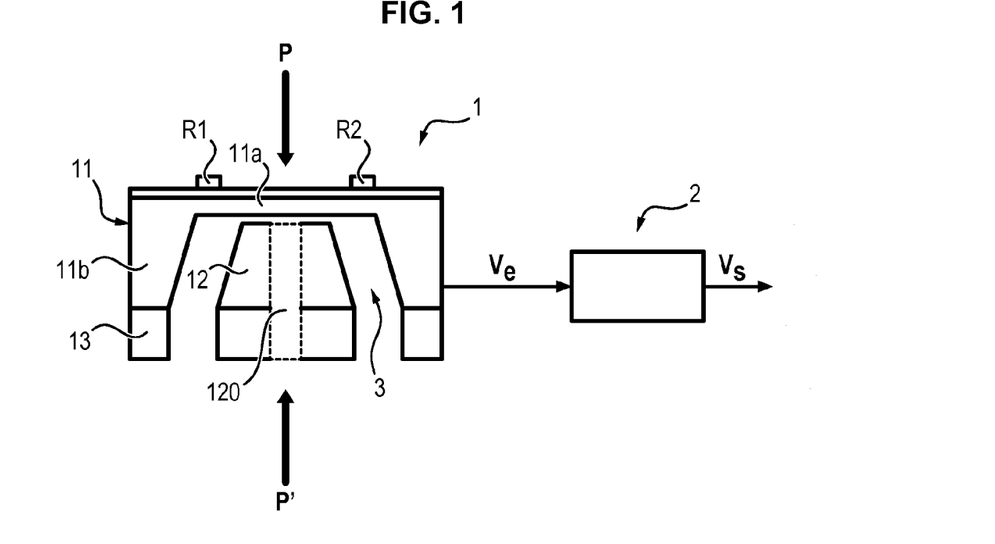
FIG. 1 illustrates a pressure measuring system according to a first embodiment of the invention.
Figure 2:
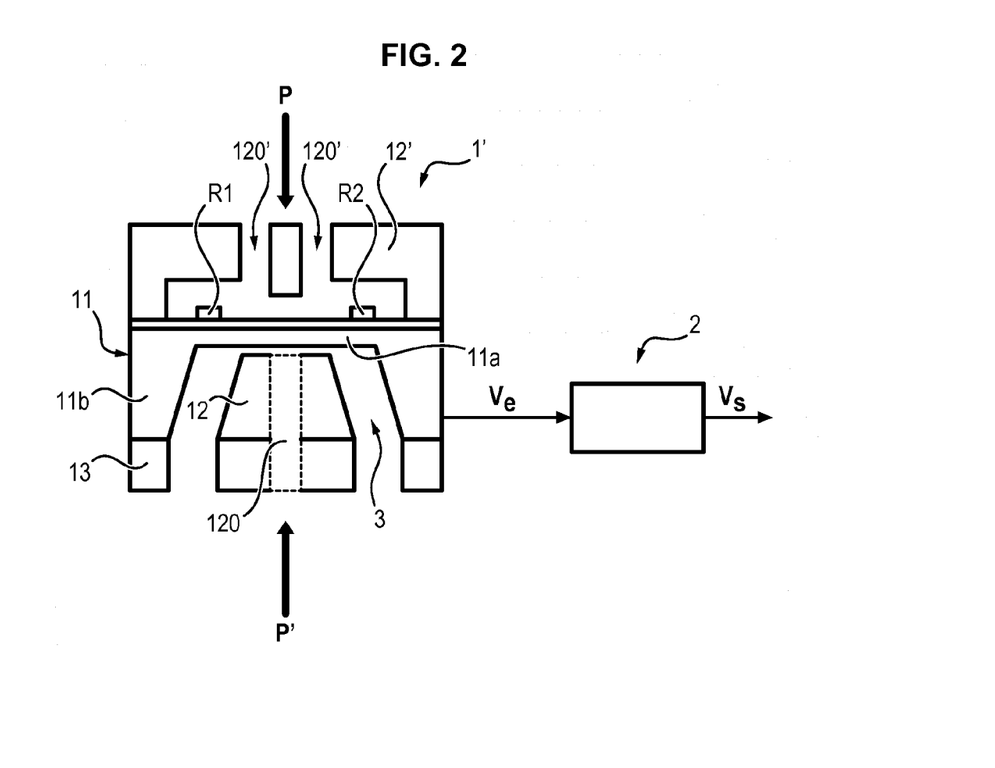
FIG. 2 illustrates a pressure measuring system according to a second embodiment of the invention.

With reference to FIGS. 1 and 2 a pressure measuring system, according to a first and a second embodiment, comprises a pressure sensor 1, 1' capable of delivering a voltage Ve representative of a detected pressure and an amplifying electronic circuit 2 connected to the pressure sensor 1, 1'.

The electronic circuit 2 is capable of delivering an output voltage Vs as a function of the voltage Ve coming from the pressure sensor 1, 1'.

The pressure sensor 1, 1' particularly comprises a deformable membrane 11 on which a resistive bridge 10 is disposed, making it possible to deliver the voltage Ve, known as the bridge voltage. This bridge voltage Ve is thus representative of a pressure P, P' applied to the deformable membrane 11 (above or below the membrane).

Figure 3:
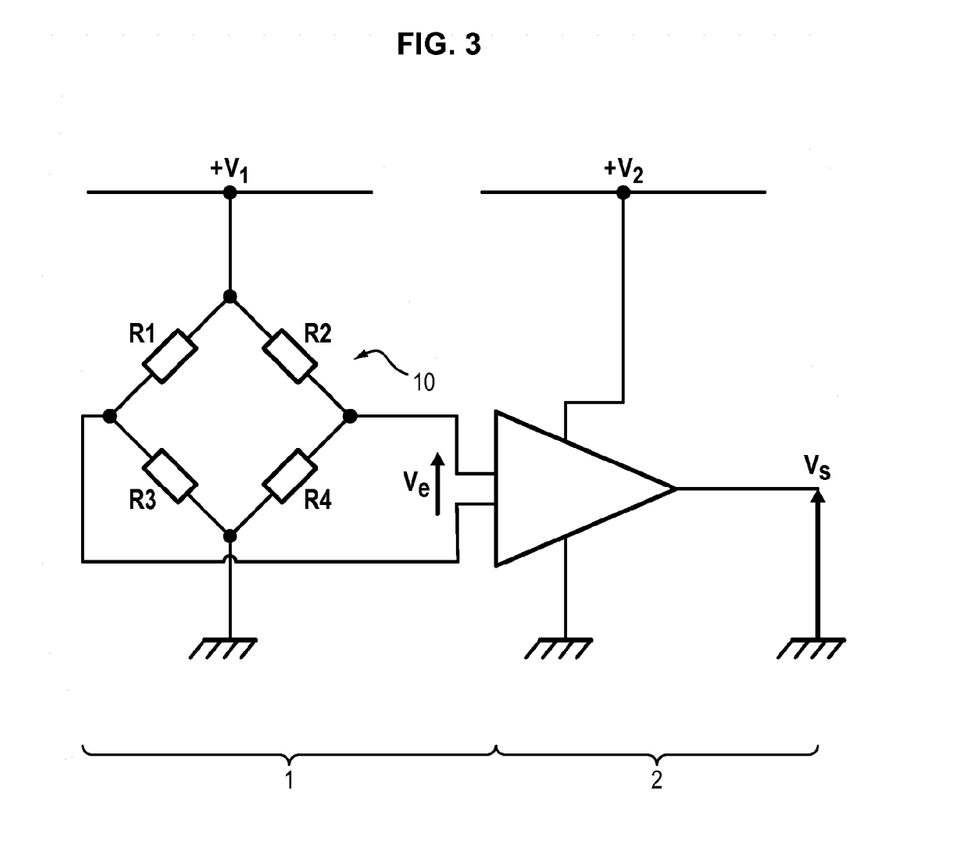
FIG. 3 illustrates a wiring diagram of a pressure measuring system according to the invention.

FIG. 3 illustrates a wiring diagram of the measuring systems according to the first and second embodiments illustrated in FIGS. 1 and 2 respectively.

The resistive bridge 10 is particularly formed of four resistive components R1, R2, R3, R4 formed by four strain gauges that translate the deformation of the deformable membrane 11 into variations of electrical resistances.

Returning to FIGS. 1 and 2, the pressure measuring system 1, 1' further comprises a system 12, 12' for limiting the deformations of the membrane 11 capable of limiting the bridge voltage Ve in the event of an overpressure or vacuum pressure at the deformable membrane of the pressure sensor 1, 1'.

In particular, the limiting system 12, 12' and the electronic circuit 2 are jointly configured so that the output voltage Vs makes it possible to distinguish a case of breakdown of the pressure sensor 1 and/or of the electronic circuit 2 from a case of overpressure or vacuum pressure at the pressure sensor 1.

The pressure sensor 1 (and therefore the resistive bridge) is powered by a bridge supply voltage V1 and the amplifying electronic circuit is powered by a supply voltage of the electronic circuit V2.

In the nominal mode, the electronic circuit 2 amplifies the bridge voltage Ve so that the output voltage Vs varies between a value between Vsmin and Vsmax for values of pressure at the deformable membrane included in a range [Pmin-Pmax].

In the case of an absolute pressure sensor 1, a pressure P is applied above the deformable membrane 11, known as the higher pressure P. In this case, an overpressure at the deformable membrane 11 corresponds to a pressure Phigher higher than a threshold Pmax.

In the case of a differential pressure sensor 1, 1' a higher pressure P is applied above the deformable membrane 11 and another pressure P' is applied below the deformable membrane 11, known as the lower pressure. In this case, an overpressure at the deformable membrane 11 corresponds to a pressure difference P−P'>Pmax and a vacuum pressure at the membrane 11 corresponds to a difference P−P'<Pmin. The nominal mode is thus for a pressure difference between Pmin and Pmax.

According to the first embodiment illustrated in FIG. 1, the limiting system 12 is thus capable of limiting a pressure P applied above the deformable membrane 11. According to this embodiment, only cases of overpressure can be distinguished from a case of failure in the pressure sensor 1 and/or in the electronic circuit 2.

In particular, according to this first embodiment, the limiting system 12 appears in the form of a lower end stop 12 disposed in the free space 3 below the deformable membrane 11.

The lower end stop 12 and the deformable membrane are preferably disposed on a support substrate 13 that can be a material made of glass, quartz silicate, Pyrex™, sapphire, alumina, Si, SiC.

The thickness of the support substrate 13 is typically between 500 μm and 2000 μm.

The membrane 11 and the lower end stop 12 are connected to the support substrate 13 by anode sealing or by means of a molecular or atomic bond with or without intermediate layer, or by sintering or brazing.

Additionally, the lower end stop 12, with reference to FIG. 1, is of generally trapezoid shape, the large base being disposed on the support substrate 13 and the small base being disposed directly below the membrane 11, particularly under its second part 11b, this small base defines a planar surface of the end stop.

In the case of a differential pressure sensor the lower end stop 12 comprises a central through recess 120 typically in the shape of a cone.

Figure 4:
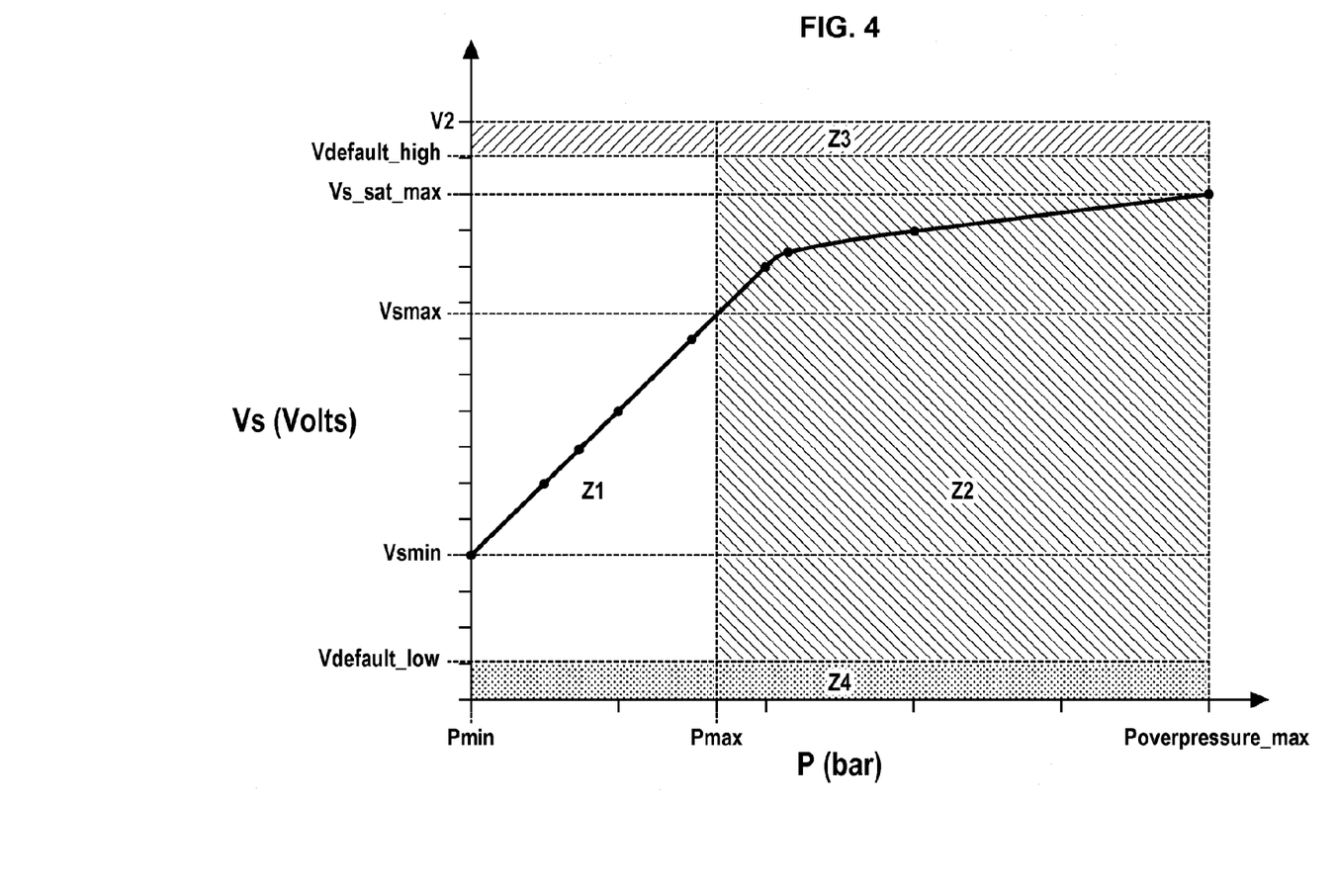
FIG. 4 illustrates an operation of the pressure measuring system according to the first embodiment of the invention.

The FIG. 4 illustrates an operation of the pressure measuring system according to the first embodiment (with a lower end stop 12). On this FIG. 3, the output voltage Vs (volts) is a function of the pressure P (bar) applied to the membrane 11 of the pressure sensor 1, the output voltage Vs is given by the following relationships Vs=G×Ve+offset with G a coefficient of amplification and offset a scale offset.

Still with reference to FIG. 4, nominal operation defines a first zone Z1 (for Vs between Vsmin and Vsmax), the situation of overpressure defines a second zone Z2 known as the overpressure zone (for Vs between Vsmax and Vs_sat_max for a pressure P between Pmax and Poverpressure_max), certain faults in the pressure sensor 1 and/or in an electronic circuit define an upper fault zone: third zone Z3 (for Vs between a voltage Vdefault_high and the supply voltage V2), and other faults in the pressure sensor 1 and/or in an electronic circuit define a lower fault voltage zone: fourth zone Z4 (for Vs between 0 and Vdefault_low).

Preferably, the saturation voltage Vs_sat_max is greater than the nominal voltage Vsmax. Moreover, the fault voltage Vdefault_high is preferably between the saturation voltage Vs_sat_max and the supply voltage V2. Finally, the fault voltage Vdefault_low is preferably below the nominal voltage Vsmin, while being nonzero.

According to the second embodiment, with reference to FIG. 2, in addition to the elements forming the pressure measuring system 1 according to the first embodiment, the pressure measuring system 1' according to the second embodiment comprises a limiting system capable, besides limiting a pressure applied above the membrane, of limiting a pressure P' (lower pressure) applied below the membrane 11 (particularly in the case of a differential pressure measuring system). In particular, the limiting system 12' makes it possible to detect besides the cases of overpressure, the cases of vacuum pressure when the difference PP' is negative.

According to this second embodiment, the limiting system comprises besides the lower end stop 12, an upper end stop 12' disposed above the deformable membrane 11.

The upper end stop 12' has recesses 120' in its center and is connected to the membrane 11 by means of anodic sealing or by means of a molecular or covalent bond with or without intermediate layer, or by sintering or by brazing.

The limiting system 12, 12' preferably consists of a material identical to that of the membrane 11 or made of alloys, sapphire, alumina, ceramic, quartz or glass. It can even be made of a material identical to that of the support substrate 13.

Figure 5:
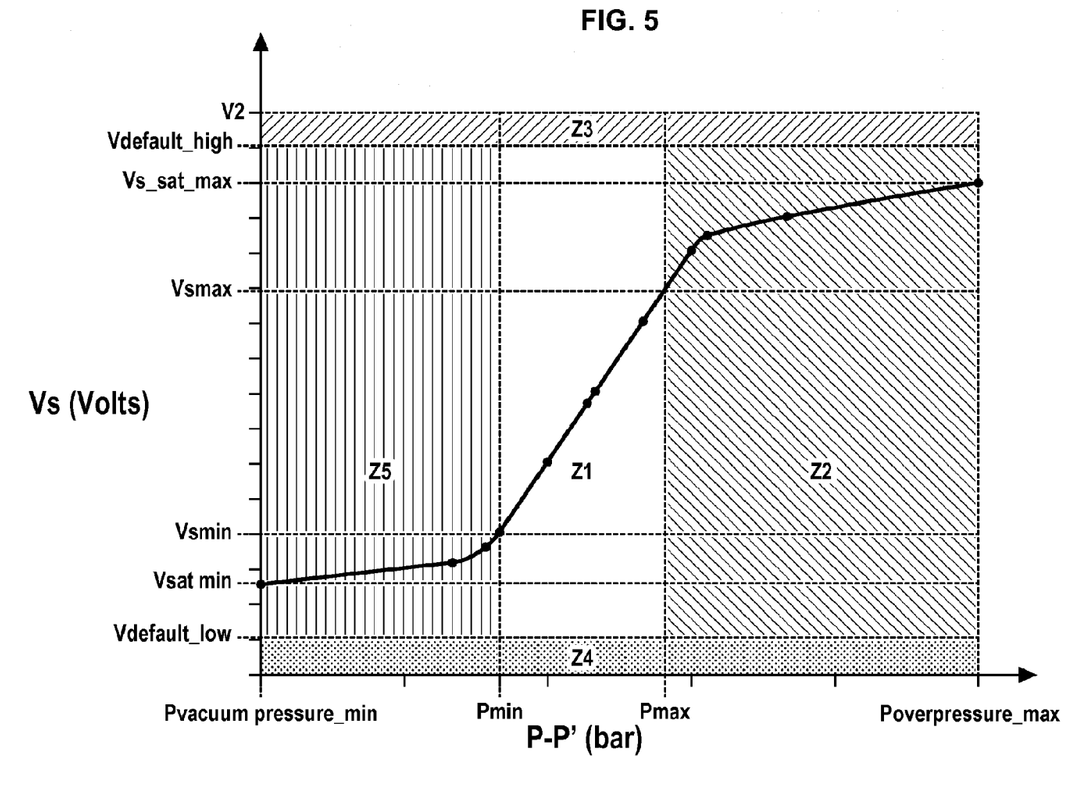
FIG. 5 illustrates an operation of the pressure measuring system according to the second embodiment of the invention.

FIG. 5 illustrates an operation of the pressure measuring system according to the second embodiment (with the lower 12 and upper 12' end stop.)

In this FIG. 5 the voltage Vs (volts) is a function of the pressure difference P–P' (bar) applied to the membrane 11 of the pressure sensor 1, the output voltage Vs is given by the following relationship Vs=G×Ve+offset with G a coefficient of amplification and offset a scale offset.

In this FIG. 5 besides the first zone Z1, the second zone Z2, the third zone Z3 and the fourth zone Z4, a fifth zone Z5 known as the vacuum pressure zone for Vs between Vsat_min and Vsmin for a pressure difference P'–P<0 at the membrane 11 between Pvacuum pressure_min and Pmin.

Preferably, the saturation voltage Vsat_min is less than the nominal voltage Vsmin. Moreover, the fault voltage Vdefault_low is preferably less than the saturation voltage Vsat_min.

As a consequence, the limiting system 12, 12' and the electronic circuit are jointly configured so that
in nominal operation, the output voltage Vs varies linearly between two values Vsmin and Vsmax for the predetermined pressure range [Pmin-Pmax];
in the case of overpressure, the output voltage Vs increases to saturate at a saturation voltage Vs_sat_max for a pressure (or pressure difference) at the deformable membrane greater than Pmax;
in the case of a fault in the pressure sensor 1 and/or in the electronic circuit 2, the output voltage Vs reaches a voltage Vdefault_high (Z3) or Vdefault_low (Z4) of the electronic circuit such that a fault in the pressure sensor 1 and/or the electronic circuit is not considered as a case of overpressure or vacuum pressure at the pressure sensor 1;
in the case of vacuum pressure, the output voltage decreases to vary between two values Vsat_min and Vs_min (Z5) for a pressure difference P'–P<Pmin at the deformable membrane 11.

Advantageously, the pressure sensor is an absolute or differential pressure sensor as described in the patent application published with the number FR 2 859 281 or FR 2 982 023, namely a pressure sensor comprising a membrane 11 suspended above a free space, a free space in which is disposed the pressure limiting system which appears in the form of an end stop. Other forms of pressure sensor can also be envisioned such as that described in the international application WO 90/04701, as long as the pressure sensor comprises a system to limit a pressure at the deformable membrane.

Preferably, as illustrated in FIGS. 1 and 2, the deformable membrane 11 comprises a first part 11a and a second part 11b surrounding the first part 11a, the second part 11b having a thickness greater than the thickness of the first part 11a in such a way as to define a free space 3, the membrane 11 being suspended above the free space 3.

The thickness of the first part 11a is typically between 20 and 100 µm, the value being defined according to the range of the mechanical or dynamic quantity to be measured.

Figure 6:
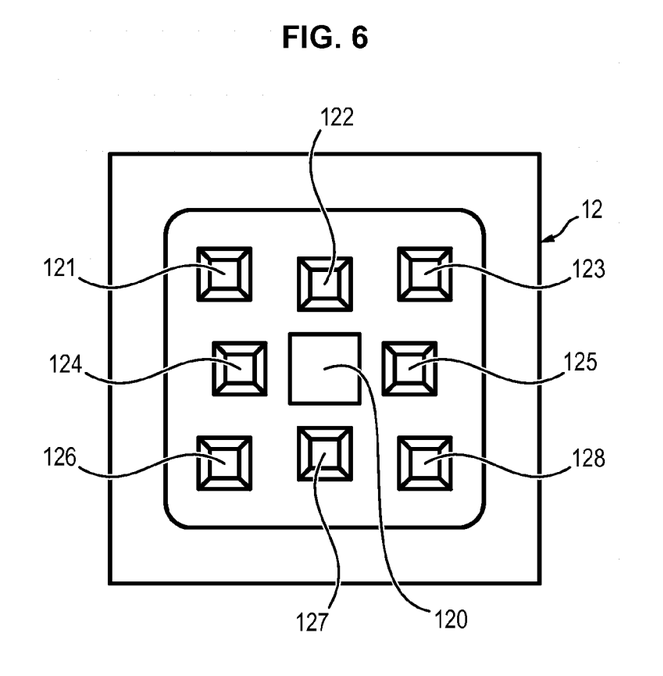
FIG. 6 illustrates an embodiment of a system for limiting the deformation of a deformable membrane of a pressure measuring system according to the invention.

FIG. 6 illustrates an embodiment of a lower end stop used in the pressure measuring system according to the first and second embodiments wherein the end stop includes islands 121-128 which extend in the free space 3 toward the membrane 11 from a planar surface of the lower end stop 12.

Such islands 121-128 form a raised structure so that in the case of contact between the islands 121-128 and the first part 11a of the membrane 11, the contact area between the islands 121-128 and the first part 11a of the membrane 11 is small in relation to the dimensions of the second part 11b of the membrane 11.

The islands thus formed allow optimal circulation of the liquid in the space between the membrane 11 and the lower end stop 12 in the situation of a pressure measurement system capable of measuring a pressure differentially.

The islands 121-128 advantageously include inclined facets that are oriented at acute angles greater than zero degrees with respect to the planar surface of the lower end stop. They are particularly in the form of mesas.

The islands 121-128 also make it possible to minimize errors due to variation in the density of the liquid (in the case of temperature variations during use of the pressure measuring system, for example from –50° C. to 180° C.) in the space located between the lower end stop 12 and the membrane 11.

The islands have a height preferably between 10 µm and 50 µm, and a width at the base between 20 µm and 200 µm.

Moreover, the islands 121-128 are dimensioned so that the first part of the membrane and the islands are spaced apart by a distance between 5 and 30 µm, preferably 10 µm.

As mentioned above, a separation exists between the lower end stop 12 and the membrane 11. This separation represents the maximum distance of deformation of the membrane 11. In this manner, a deformation greater than this separation then makes the membrane 11 bear against the lower end stop 12 which prevents an excessive deformation linked to an overpressure. It is in particular against the islands that the membrane 11 will bear in the event of an overpressure applied to the pressure sensor 1.

Advantageously, the value of this separation can be chosen as a function of the parameters of resistance to deformation of the membrane 11 (notably dependent on its thickness and on the material of which it is formed) with a threshold separation above which the membrane runs the risk of being damaged.

It is thus possible to adjust the parameters of the lower end stop 12 according to the application in question.

The invention claimed is:
1. A pressure measuring system comprising:
a pressure sensor (1) comprising:
a deformable membrane (11) on which a resistive bridge (10) is disposed, said resistive bridge (10) delivering a bridge voltage (Ve) representative of a deformation of the deformable membrane (11) caused by a pressure (P, P') applied on said deformable membrane;

a system (12, 12') for limiting the deformations of the deformable membrane (11) and limiting the bridge voltage (Ve) in the case of overpressure or vacuum pressure at the deformable membrane;

an amplifying electronic circuit (2) connected to the resistive bridge, said amplifying electronic circuit (2) delivering an output voltage (Vs) as a function of the bridge voltage (Ve);

wherein the limiting system (12, 12') and the electronic circuit (2) are jointly configured so that the output voltage (Vs) makes it possible to distinguish a case of a fault in the pressure sensor (1) and/or in the electronic circuit (2) from a case of overpressure or vacuum pressure at the deformable membrane, the limiting system and the electronic circuit being jointly configured so that:

in nominal operation, the output voltage (Vs) varies linearly between two values Vsmin and Vsmax for a pressure at the deformable membrane between Pmin and Pmax;

in the case of overpressure at the deformable membrane, the output voltage (Vs) increases to saturate at a saturation voltage Vs_sat_max for a pressure at the deformable membrane (11) greater than Pmax;

in the case of vacuum pressure at the deformable membrane, the output voltage (Vs) decreases to saturate at a saturation voltage Vsat_min for a pressure difference at the membrane less than Pmin;

in the case of a fault in the pressure sensor (1) and/or in the electronic circuit (2) the output voltage (Vs) reaches a voltage between a high fault voltage Vdefault_high and a supply voltage of the electronic circuit V2, or reaches a voltage between 0 and a low fault voltage Vdefault_low.

2. The pressure measuring system according to claim 1, wherein the high fault voltage Vdefault_high is strictly greater than the saturation voltage Vs_sat_max, the saturation voltage Vs_sat_max is strictly greater than the nominal voltage value Vsmax, the low fault voltage Vdefault_low is strictly less than the saturation voltage Vs_sat_min, and the saturation voltage Vsat_min is strictly less than the nominal voltage value Vsmin.

3. The pressure measuring system according to any one of claim 1 or 2, wherein the deformable membrane (11) comprises a first part (11a) and a second part (11b) surrounding the first part (11a), the second part (11b) having a thickness greater than the thickness of the first part (11a) in such a way as to define a free space (3), the membrane being suspended above the free space (3).

4. The pressure measuring system according to claim 1, wherein the limiting system (12, 12') comprises a lower end stop (12) capable of limiting the deformations of the deformable membrane (11), said lower end stop (12) being disposed below the deformable membrane (11).

5. The pressure measuring system according to claim 4, wherein the limiting system further comprises an upper end stop (12') capable of limiting the deformations of the deformable membrane (11), said upper end stop (12') being disposed above the deformable membrane (11).

6. The pressure measuring system according to claim 1, wherein the lower end stop includes islands (121-128) that extend in the free space (3) toward the membrane (11) from a planar surface of the lower end stop (12), the islands (121-128) forming a raised structure so that in the event of contact between the islands (121-128) and the first part (11a) of the membrane (11), the contact area between the islands (121-128) and the first part (11a) of the membrane (11) is small in relation to the dimensions of the first part (11b) of the membrane (11).

7. The pressure measuring system according to claim 1, wherein the limiting system (12, 12') includes a central through recess (120, 120'), the measuring system being then capable of measuring a pressure differentially.

8. The pressure measuring system according to claim 1, wherein the limiting system (12, 12') is made of material chosen from among the following materials: glass; quartz; alumina; ceramic; alloys; Si; SiC; sapphire.

* * * * *